United States Patent
Chundrlik, Jr. et al.

(10) Patent No.: US 12,024,181 B2
(45) Date of Patent: *Jul. 2, 2024

(54) VEHICULAR DRIVING ASSIST SYSTEM WITH SENSOR OFFSET CORRECTION

(71) Applicant: Magna Electronics Inc., Auburn Hills, MI (US)

(72) Inventors: William J. Chundrlik, Jr., Rochester Hills, MI (US); Dominik Raudszus, Aachen (DE)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,200

(22) Filed: Jul. 17, 2023

(65) Prior Publication Data

US 2023/0373501 A1   Nov. 23, 2023

Related U.S. Application Data

(63) Continuation of application No. 16/948,319, filed on Sep. 14, 2020, now Pat. No. 11,702,088, which is a
(Continued)

(51) Int. Cl.
*B60W 50/02* (2012.01)
*B60W 50/029* (2012.01)

(52) U.S. Cl.
CPC . *B60W 50/0205* (2013.01); *B60W 2050/0215* (2013.01); *B60W 2050/0295* (2013.01); *B60W 2420/403* (2013.01)

(58) Field of Classification Search
None
See application file for complete search history.

(56) References Cited

U.S. PATENT DOCUMENTS 5,550,677 A   8/1996   Schofield et al.
5,670,935 A   9/1997   Schofield et al.
(Continued)

OTHER PUBLICATIONS

Blanc et al., "Semiconductor Image Sensing", in "More than Moore: Creating High Value Micro/Nanoelectronics Systems", 2009, pp. 239-278 (Year: 2009).*

(Continued)

*Primary Examiner* — Tamara L Weber
(74) *Attorney, Agent, or Firm* — HONIGMAN LLP

(57) ABSTRACT

A vehicular driving assist system includes a forward viewing camera, a forward sensing non-vision sensor, and an electronic control unit (ECU) disposed at a vehicle equipped with the vehicular driving assist system. Captured image data is transferred from the camera to the ECU and processed at the ECU and captured sensor data is transferred from the non-vision sensor to the ECU and processed at the ECU. An object forward of the equipped vehicle is detected via processing at the ECU of transferred image data and via processing at the ECU of transferred sensor data. The ECU determines a difference between detection of the object via processing at the ECU of transferred image data and detection of the object via processing at the ECU of transferred sensor data. The ECU disables at least part of a driving assist function based on the determined difference being greater than a threshold level.

62 Claims, 2 Drawing Sheets

Related U.S. Application Data continuation of application No. 16/199,479, filed on Nov. 26, 2018, now Pat. No. 10,773,729, which is a continuation of application No. 15/291,319, filed on Oct. 12, 2016, now Pat. No. 10,137,904.

(60) Provisional application No. 62/241,299, filed on Oct. 14, 2015.

(56) References Cited

U.S. PATENT DOCUMENTS

| | | |
|---|---|---|
| 5,949,331 A | 9/1999 | Schofield et al. |
| 6,087,953 A | 7/2000 | DeLine et al. |
| 6,172,613 B1 | 1/2001 | DeLine et al. |
| 6,243,003 B1 | 6/2001 | DeLine et al. |
| 6,250,148 B1 | 6/2001 | Lynam |
| 6,278,377 B1 | 8/2001 | DeLine et al. |
| 6,326,613 B1 | 12/2001 | Heslin et al. |
| 6,420,975 B1 | 7/2002 | DeLine et al. |
| 6,428,172 B1 | 8/2002 | Hutzel et al. |
| 6,445,287 B1 | 9/2002 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,710,770 B2 | 3/2004 | Tomasi et al. |
| 6,824,281 B2 | 11/2004 | Schofield et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,004,593 B2 | 2/2006 | Weller et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,289,037 B2 | 10/2007 | Uken et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,480,149 B2 | 1/2009 | DeWard et al. |
| 7,720,580 B2 | 5/2010 | Higgins-Luthman |
| 8,013,780 B2 | 9/2011 | Lynam |
| 8,027,029 B2 | 9/2011 | Lu et al. |
| 8,049,802 B2 * | 11/2011 | Fowler ................ H04N 23/698 348/308 |
| 8,256,821 B2 | 9/2012 | Lawlor et al. |
| 8,466,827 B2 | 6/2013 | Nanami |
| 8,849,495 B2 | 9/2014 | Chundrik, Jr. et al. |
| 9,205,776 B2 | 12/2015 | Turk |
| 9,260,095 B2 | 2/2016 | Chundrlik, Jr. et al. |
| 9,596,387 B2 | 3/2017 | Achenbach et al. |
| 9,871,971 B2 | 1/2018 | Wang et al. |
| 10,137,904 B2 | 11/2018 | Chundrlik, Jr. et al. |
| 10,479,377 B2 | 11/2019 | Nishida |
| 10,773,729 B2 | 9/2020 | Chundrlik, Jr. et al. |
| 11,702,088 B2 | 7/2023 | Chundrlik, Jr. et al. |
| 2009/0295181 A1 | 12/2009 | Lawlor et al. |
| 2010/0245066 A1 | 9/2010 | Sarioglu et al. |
| 2012/0218412 A1 | 8/2012 | Dellantoni et al. |
| 2014/0139369 A1 | 5/2014 | Baba |
| 2014/0156157 A1 | 6/2014 | Johnson et al. |
| 2014/0160284 A1 | 6/2014 | Achenbach et al. |
| 2014/0222280 A1 | 8/2014 | Salomonsson et al. |
| 2014/0226012 A1 | 8/2014 | Achenbach |
| 2014/0340518 A1 | 11/2014 | Kambe et al. |
| 2014/0343750 A1 | 11/2014 | Minemura et al. |
| 2014/0347486 A1 | 11/2014 | Okouneva |
| 2015/0266422 A1 | 9/2015 | Chundrlik, Jr. et al. |
| 2015/0327398 A1 | 11/2015 | Achenbach et al. |
| 2016/0162743 A1 | 6/2016 | Chundrlik, Jr. et al. |
| 2017/0032196 A1 | 2/2017 | Gupta |
| 2017/0080929 A1 | 3/2017 | Sawamoto |
| 2017/0108863 A1 | 4/2017 | Chundrlik, Jr. et al. |
| 2017/0205506 A1 | 7/2017 | Voorheis et al. |
| 2017/0262712 A1 | 9/2017 | Chundrlik, Jr. et al. |

OTHER PUBLICATIONS

Ogawa et al., "Pedestrian Detection and Tracking using in-vehicle Lidar for Automotive Application", 2011 IEEE Intelligent Vehicles Symposium (IV), Baden-Baden, Germany, Jun. 5-9, 2011, pp. 734-739 (Year: 2011).

Bores et al., "A Model-Based Approach for Fast Vehicle Detection in Continuously Streamed Urban LIDAR Point Clouds", Asian Conference on Computer Vision, ACCV 2014 Workshops, pp. 413-425 (Year: 2014).

* cited by examiner

VEHICULAR DRIVING ASSIST SYSTEM WITH SENSOR OFFSET CORRECTION

CROSS REFERENCE TO RELATED APPLICATIONS

The present application is a continuation of U.S. patent application Ser. No. 16/948,319, filed Sep. 14, 2020, now U.S. Pat. No. 11,702,088, which is a continuation of U.S. patent application Ser. No. 16/199,479, filed Nov. 26, 2018, now U.S. Pat. No. 10,773,729, which is a continuation of U.S. patent application Ser. No. 15/291,319, filed Oct. 12, 2016, now U.S. Pat. No. 10,137,904, which claims the filing benefits of U.S. provisional application Ser. No. 62/241,299, filed Oct. 14, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more camera modules or cameras (preferably one or more CMOS cameras) to capture image data representative of images exterior of the vehicle, including a camera module configured for attachment at a windshield of a vehicle equipped with the vision system. The system uses a forward viewing camera and a forward sensing non-imaging sensor and determines if the non-imaging sensor is functioning properly. If the system determines that the non-imaging sensor is not detecting an object associated with a camera-sensed vehicle (ahead of the equipped vehicle), then the system may be disabled following a period of time and if the vehicle is traveling above a threshold speed. If the system determines that the non-imaging sensor is detecting an object associated with a camera-sensed vehicle, but the angular offset between the two sensors is above a threshold level, the system may correct the offset or may disable the driver assistance system function (depending on how great the offset is).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
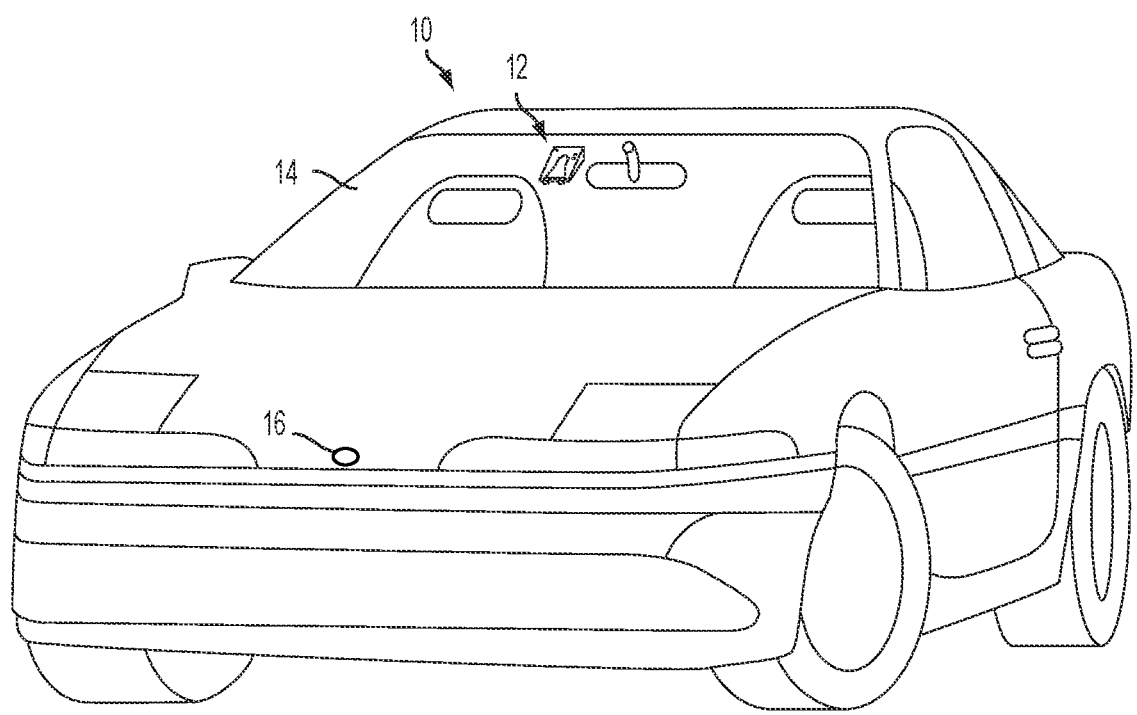
FIG. 1 is a plan view of a vehicle with a vision system that incorporates cameras in accordance with the present invention.

Referring now to the drawings and the illustrative embodiments depicted therein, a vehicle 10 includes an imaging system or vision system that includes a forward viewing camera module 12 that is disposed at and views through the windshield 14 of the vehicle and captures image data of the scene exterior and forward of the vehicle (FIG. 1). The camera module includes a lens for focusing images at or onto an imaging array or imaging plane or imager of the camera. The forward viewing camera views through the windshield and forward of the vehicle, such as for a machine vision system (such as for traffic sign recognition, headlamp control, pedestrian detection, collision avoidance, lane marker detection and/or the like). The vision system includes a control or electronic control unit (ECU) or processor (where the ECU may include the control and processor) that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

The camera system or camera module of the present invention may utilize aspects of the systems and/or modules described in International Publication Nos. WO 2013/123161 and/or WO 2013/019795, and/or U.S. Pat. Nos. 8,256,821; 7,480,149; 7,289,037; 7,004,593; 6,824,281; 6,690,268; 6,445,287; 6,428,172; 6,420,975; 6,326,613; 6,278,377; 6,243,003; 6,250,148; 6,172,613 and/or 6,087,953, and/or U.S. Publication Nos. US-2015-0327398; US-2014-0226012 and/or US-2009-0295181, which are all hereby incorporated herein by reference in their entireties. Optionally, the vision system may include a plurality of exterior facing imaging sensors or cameras, such as a rearward facing imaging sensor or camera, a forwardly facing camera at the front of the vehicle, and sidewardly/rearwardly facing cameras at respective sides of the vehicle, which capture image data representative of the scene exterior of the vehicle.

The system also includes at least one other forward sensing sensor 16, such as a radar sensor or laser sensor or lidar sensor (such as a 3D lidar sensor capturing a three dimensional point cloud of sensing data) or ultrasonic sensor or the like. The other forward sensor captures sensing data that is processed by a data processor of the system to detect or determine the presence of objects ahead of the vehicle.

Many advanced driver assistance systems (ADAS) require information regarding the location and motion of subject and preceding vehicles and the environment of the roadway these vehicles are traveling. Determination of object location and motion may utilize various sensing technologies including, for example, imaging, light, electromagnetics, ultrasound, and/or the like. In many applications, two sensors are utilized to reduce the risk of false detections by means of redundancy. These sensors may be mounted inside and/or outside of the vehicle. Typically, a forward viewing camera is utilized in ADAS applications where forward looking sensing is required. Such a camera is typically located behind the windshield and views through the windshield of the vehicle. Radars and/or lasers are typically located in areas forward of the vehicle radiator.

Combining captured data from two sensors that are mounted at significantly different locations can be challenging. The sensor data processing needs to comprehend sensor location differences based on a vehicle reference point and occurrence of sensor misalignment. Sensor misalignment determination and correction has a great potential of occurrence for the sensor mounted in an area that can be subject to impacts, such as, for example, in front of the vehicle radiator. Such misalignment may result in incorrect association of object information derived from sensors mounted in different vehicle locations.

To avoid these situations, features that utilize sensors located in different vehicle locations require sensor offset determination and correction. Also, because these sensors may be very sensitive to angular alignment, this offset can cause errors in the measurement of the lateral position of surrounding objects and thus can lead to unintended behavior of the ADAS (which functions responsive to a determined location and movement of an object detected in a field of view of a camera and field of sensing of a non-imaging sensor), associated with not taking action when it is appropriate or a false action such as active emergency braking when it is not warranted. If the magnitude of the correction exceeds the performance capability of the sensor the associated ADAS application is disabled.

The present invention utilizes an object association algorithm which assigns objects from one sensor (such as the camera 12) to objects from another sensor (such as the non-imaging sensor 16) and integrates sensor offset compensation functionality. The compensation functionality checks if a sensor offset is present and corrects the sensor offset if necessary. Sensor misalignment is calculated and corrected by continuously calculating the mean average m of the angle measurement difference between both sensors ($\theta_1$, $\theta_2$) for the closest in-path vehicle (CIPV) according to Equation 1 below.

$$m_{k+1} = \frac{n-1}{n} m_k + \frac{1}{n}(\theta_1 - \theta_2); \quad \text{(Equation 1)}$$

where n represents the number of measurements that is incorporated in the mean value, $m_{k+1}$ is the mean value of the current time step, and $m_k$ represents the mean value of the previous time step.

Assuming that the average difference of angle measurements between both sensors for a sufficiently long time period is zero, in case no misalignment is present, sensor misalignment can be detected by comparing the average error to a threshold constant $K_1$. This information may be used to disable certain functions or to compensate the sensor offset by adding the calculated offset to the sensor measurement.

Figure 2:
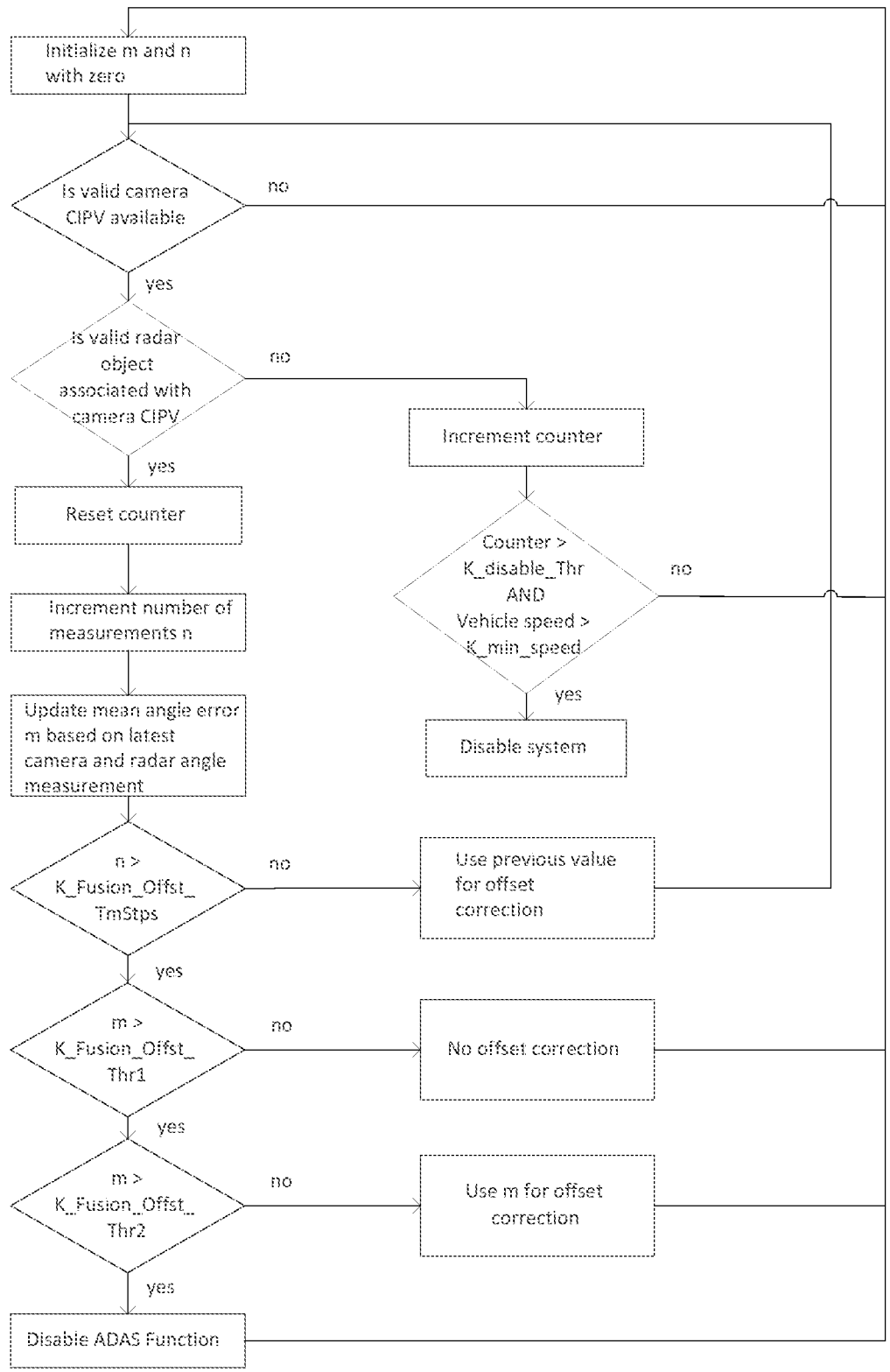
FIG. 2 is a flow chart of the process of the system of the present invention.

FIG. 2 shows a block diagram of the sensor offset correction algorithm of the present invention. The mean angle error m and number of measurements n are initialized with 0. In each time step, the algorithm checks if a valid camera sensed CIPV (closest in-path vehicle, such as a vehicle traveling on the road ahead of the equipped or subject vehicle and thus in the field of view/sensing of the camera and sensor) is available and a valid radar sensed object is associated with this object. In this case, the number of measurements n is incremented and the mean angle error according to Equation 1 (above) is updated based on camera angle $\theta_1$ and radar angle $\theta_2$. If the number of measurements n exceeds the threshold K_Fusion_Offst_TmStps, a valid sensor offset is available. K_Fusion_Offst_TmStps defines the measurement duration that is taken into account for calculation of mean angle error. If n exceeds this threshold and the mean angle error m is greater than a first threshold level (K_Fusion_Offst_Thr1), the sensor offset is corrected by m. In case the mean angle error is greater than a second threshold level (K_Fusion_Offst_Thr2), the ADAS function is disabled.

After a valid sensor offset has been calculated (i.e., n>K_Fusion_Offst_TmStps and m<K_Fusion_Offst_Thr1 or Thr2), the mean angle error m and the number of measurements n are reset to 0 and the calculation is repeated. In case no valid radar object is associated with the camera CIPV, a counter is incremented. If this counter exceeds a threshold level (K_disable_Thr) and the vehicle speed is greater than a threshold speed (K_min_speed), the system is disabled. Otherwise, the algorithm checks again for a valid camera CIPV and a valid association. The Counter is reset when a radar object is associated with camera CIPV. The system is disabled because the radar is not detecting an object associated with a camera CIPV for a prolonged period of time, and thus, either the radar may be misaligned beyond a correctable state or is otherwise not functioning properly. Responsive to such determination of radar malfunctioning, the sensing system may be disabled or the driver assistance function may be disabled or the driver assistance function may only utilize processing of image data captured by the camera and may not rely on processing of sensor data sensed by the radar sensor. Similarly, if the system determines that image processing of image data captured by the camera fails to detect the presence of a vehicle or object detected via processing of sensor data sensed by the radar sensor, the system may disable the camera or image processor or the driver assistance function may only utilize processing of sensor data sensed by the radar sensor and may not rely on processing of image data captured by the camera.

Thus, the present invention is operable to disable the ADAS function or sensing system when a determination is made that there is a sensor offset that may result in erroneous detections or measurements. The system determines if there is a valid radar object detection associated with a camera-detected closest in path vehicle. If the system determines that there is no such valid radar object detection, then the sensing system (at least the radar part of the sensing system) is disabled after a threshold number of such determinations and if the vehicle speed is greater than a threshold value. If the system determines that there is such a valid radar object detection associated with a camera-sensed CIPV, but the angle error is above a threshold level, then the ADAS function may be disabled to avoid erroneous actions by the ADAS function.

The system thus uses a vision-based (camera) system and a non-vision-based (e.g., radar or lidar or the like) system. The image data captured by the camera(s) and the sensor data sensed by the radar sensor(s) are provided to a control, and the image data and sensor data may be fused at the control. The control, responsive to processing of image data captured by the camera, is operable to detect the presence of a vehicle exterior of the equipped vehicle and in the forward field of view of the camera and to determine a vision-based angle of the determined vehicle relative to the equipped vehicle. Also, the control, responsive to processing of sensor data sensed by the non-imaging sensor, is operable to detect the presence of the vehicle (the vehicle determined to be present via image processing of captured image data) exterior of the equipped vehicle and to determine a sensor-based angle of the determined vehicle relative to the equipped vehicle. The angles may represent a determined angle between a current directional heading of the vehicle and a center of the detected vehicle or any other point on the detected vehicle that can be determined by both image processing of captured image data and processing of sensed sensor data.

The control determines an angle difference between the vision-based angle (the angle of the determined vehicle relative to the equipped vehicle as determined via processing of image data captured by the camera) and the sensor-based angle (the angle of the determined vehicle relative to the equipped vehicle as determined via processing of sensor data sensed by the non-imaging sensor). The control disables a driver assistance system function at least in part responsive to the determined angle difference being greater than a disable threshold level (such as greater than, for example, a two degree difference or greater than, for example, a five degree difference or any suitable or selected threshold offset). The control may also disable the non-imaging sensor system at least in part responsive to the control not determining, when processing of sensor data sensed by the non-imaging sensor, the presence of the determined vehicle for a period of time.

In other words, if both sensing systems detect a vehicle, but indicate that the vehicle is at a different location (offset angle) relative to the equipped vehicle (so as to be at a different angle relative to the vehicle), with the different angle being greater than a disable threshold angle, then the control disables the driver assistance system function, since this is indicative of one of the systems being misaligned such that the captured image data and sensed sensor data cannot be trusted. Also, if both sensing systems detect the vehicle, but indicate that the vehicle is at a different angle relative to the vehicle, with the different angle being less than the disable threshold angle, but greater than a correction threshold angle (such as greater than about 1 degree but less than about 5 degrees or any other suitable or selected range of offset), then the system provides an offset correction (which comprise an average of the vision-based angle and the sensor-based angle over a period of time that is used for determining the location of the detected vehicle or object relative to the equipped vehicle, or optionally which may be used to adjust or calibrate the camera and/or the non-imaging sensor to accommodate or correct for the determined offset) and continues to process captured image data and sensed sensor data.

For example, if a driver assistance system function (such as automatic emergency braking or adaptive cruise control or lane departure warning or the like) is responsive to a detected vehicle and location and motion of that vehicle relative to the equipped vehicle, the system of the present invention may disable that function when the angle error or difference (between the vision-based angle and the sensor-based angle) is greater than a threshold amount, but may use an average of the vision-based angle and the sensor-based angle for determining the location of the detected vehicle for that driver assistance system function when the angle error or difference is less than the disable threshold amount. Moreover, if the non-imaging sensor fails to even detect the presence of the vehicle detected by the imaging system, then the system disables the non-imaging sensing system, since this is indicative of the non-imaging sensor not functioning properly, such that the sensed sensor data cannot be trusted.

Thus, in accordance with the present invention, image data captured by the forward viewing camera that views forward through the vehicle windshield is provided to the control, wherein, via image processing of captured image data by an image processor of the control, the control controls a plurality of driver assistance functions, including, for example, at least three selected from (i) automatic headlamp control, (ii) lane keeping assist, (iii) traffic sign recognition, (iv) forward collision warning, (v) automatic emergency braking, and (vi) pedestrian detection. For driver assistance functions such as forward collision warning, automatic emergency braking and pedestrian detection, the control preferably also receives and processes sensor data sensed by a non-imaging sensor (such as a radar sensor or a lidar sensor) of the equipped vehicle. For driver assistance functions such as automatic headlamp control, lane monitoring/lane keeping, and traffic sign recognition, these driver assistance functions are provided by image processing of captured image data without need to process non-image data sensed by any non-imaging sensor of the equipped vehicle.

In accordance with the present invention, when the control determines that the angle difference between the vision-based angle and the sensor-based angle is greater than the disable threshold level, the control disables one or more driver assistance functions (such as forward collision warning, automatic emergency braking and pedestrian detection) and preferably alerts the driver that such driver assistance functions have been disabled, so that the driver relies on his/her own driving abilities for safe maneuvering of the equipped vehicle. When the likes of an automatic emergency braking driver assistance function is disabled because of unreliability in angle measurement/estimation from the equipped vehicle to a detected other vehicle, other driver assistance functions that do not rely on or require such angle determination (such as automatic headlamp control or lane departure warning or traffic sign recognition) need not be disabled. Thus, when the data being processed may not be reliable, the system disables driver assistance functions such as forward collision warning, automatic emergency braking and pedestrian detection that rely on sensing or sensor fusion of image data and sensor data, and may not disable other driver assistance functions that do not rely on image data and sensor data.

The system may utilize sensors, such as radar or lidar sensors or the like. The sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. provisional applications, Ser. No. 62/330,557, filed May 2, 2016, Ser. No. 62/313,279, filed Mar. 25, 2016, Ser. No. 62/303,546, filed Mar. 4, 2016, and/or Ser. No. 62/289,441, filed Feb. 1, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, said vehicular driving assist system comprising:
   a camera disposed at an in-cabin side of a windshield of a vehicle equipped with said vehicular driving assist system, said camera viewing through the windshield at least forward of the equipped vehicle, said camera capturing image data;
   wherein said camera comprises an imaging array sensor having at least one million photosensor elements arranged in rows and columns;
   a radar sensor disposed at the equipped vehicle and sensing at least forward of the equipped vehicle, said radar sensor capturing sensor data;
   wherein captured image data is transferred from said camera to an electronic control unit (ECU) disposed at the equipped vehicle;
   wherein captured sensor data is transferred from said radar sensor to said ECU;
   wherein said ECU comprises at least one data processor;
   wherein transferred image data and transferred sensor data are processed at said ECU;
   wherein another vehicle forward of the equipped vehicle is detected via processing at said ECU of transferred image data and via processing at said ECU of transferred sensor data;
   wherein said ECU determines a difference between detection of the other vehicle via processing at said ECU of transferred image data and detection of the other vehicle via processing at said ECU of transferred sensor data; and
   wherein said ECU disables at least part of a driving assist function based on the determined difference being greater than a threshold level.

2. The vehicular driving assist system of claim 1, wherein the driving assist function comprises at least three selected from the group consisting of (i) automatic headlamp control, (ii) lane keeping assist and (iii) traffic sign recognition.

3. The vehicular driving assist system of claim 1, wherein the driving assist function comprises a forward collision warning function.

4. The vehicular driving assist system of claim 1, wherein the driving assist function comprises an automatic emergency braking function.

5. The vehicular driving assist system of claim 1, wherein the driving assist function comprises a pedestrian detection function.

6. The vehicular driving assist system of claim 1, wherein, responsive to said ECU disabling at least part of the driving assist function, said ECU generates an output to alert a driver of the equipped vehicle that the at least part of the driving assist function has been disabled.

7. The vehicular driving assist system of claim 1, wherein the at least part of the driving assist function that is disabled by said ECU comprises the entire driving assist function.

8. The vehicular driving assist system of claim 1, wherein the difference between detection of the other vehicle via processing at said ECU of transferred image data and detection of the other vehicle via processing at said ECU of transferred sensor data is determined via said ECU determining presence of the other vehicle via processing of transferred image data and said ECU failing to detect the other vehicle via processing of transferred sensor data.

9. The vehicular driving assist system of claim 8, wherein the at least part of the driving assist function that is disabled by said ECU comprises processing of transferred sensor data for object detection so that the driving assist function is provided responsive to processing of transferred image data.

10. The vehicular driving assist system of claim 1, wherein the difference between detection of the other vehicle via processing at said ECU of transferred image data and detection of the other vehicle via processing at said ECU of transferred sensor data is determined via said ECU determining presence of the other vehicle via processing of transferred sensor data and said ECU failing to detect the other vehicle via processing of transferred image data.

11. The vehicular driving assist system of claim 10, wherein the at least part of the driving assist function that is disabled by said ECU comprises processing of transferred image data for object detection so that the driving assist function is provided responsive to processing of transferred sensor data.

12. The vehicular driving assist system of claim 1, wherein the difference between detection of the other vehicle via processing at said ECU of transferred image data and detection of the other vehicle via processing at said ECU of transferred sensor data is determined via said ECU determining misalignment of said radar sensor relative to said camera.

13. The vehicular driving assist system of claim 12, wherein said ECU, via processing of transferred image data, determines a vision-based angle of the detected other vehicle relative to the equipped vehicle, and wherein said ECU, via processing of transferred sensor data, determines a sensor-based angle of the detected other vehicle relative to the equipped vehicle, and wherein, based on the determined vision-based angle and the determined sensor-based angle, said ECU disables the at least part of the driving assist function.

14. The vehicular driving assist system of claim 13, wherein said ECU disables the at least part of the driving assist function based at least in part on a determined angle difference between the determined vision-based angle and the determined sensor-based angle being greater than a disable threshold angle.

15. The vehicular driving assist system of claim 14, wherein, responsive at least in part to the determined angle difference being greater than a correction threshold angle and less than the disable threshold angle, a corrected angle of the detected other vehicle relative to the equipped vehicle is determined for use with the driving assist function.

16. The vehicular driving assist system of claim 15, wherein the corrected angle is determined after a threshold period of time during which the determined angle difference is greater than the correction threshold angle and less than the disable threshold angle.

17. The vehicular driving assist system of claim 1, wherein said ECU determines misalignment of said radar sensor relative to said camera responsive to (i) detecting the other vehicle at a first location via processing of transferred image data, (ii) detecting the other vehicle at a second location via processing of transferred sensor data, and (iii) determining that the second location of the detected other vehicle is different from the first location of the detected other vehicle by at least a threshold amount.

18. The vehicular driving assist system of claim 1, wherein said ECU operates to determine the difference between detection of the other vehicle via processing at said ECU of transferred image data and detection of the other vehicle via processing at said ECU of transferred sensor data responsive at least in part to a vehicle speed of the equipped vehicle being greater than a threshold speed.

19. The vehicular driving assist system of claim 1, wherein said ECU disables the at least part of the driving assist function responsive at least in part to a vehicle speed of the equipped vehicle being greater than a threshold speed.

20. The vehicular driving assist system of claim 1, wherein said ECU disables the at least part of the driving assist function based on the determined difference being greater than the threshold level for a threshold period of time.

21. The vehicular driving assist system of claim 1, wherein transferred image data and transferred sensor data are fused at said ECU.

22. The vehicular driving assist system of claim 1, wherein the imaging array sensor of said camera comprises a CMOS imaging array sensor.

23. The vehicular driving assist system of claim 1, wherein said radar sensor is disposed at a front portion of the equipped vehicle.

24. A vehicular driving assist system, said vehicular driving assist system comprising:
a camera disposed at an in-cabin side of a windshield of a vehicle equipped with said vehicular driving assist system, said camera viewing through the windshield at least forward of the equipped vehicle, said camera capturing image data;
wherein said camera comprises an imaging array sensor having at least one million photosensor elements arranged in rows and columns;
a 3D lidar sensor disposed at the equipped vehicle and sensing at least forward of the equipped vehicle, said 3D lidar sensor capturing sensor data;
wherein captured image data is transferred from said camera to an electronic control unit (ECU) disposed at the equipped vehicle;
wherein captured sensor data is transferred from said 3D lidar sensor to said ECU;
wherein said ECU comprises at least one data processor;
wherein transferred image data and transferred sensor data are processed at said ECU;
wherein another vehicle forward of the equipped vehicle is detected via processing at said ECU of transferred image data and via processing at said ECU of transferred sensor data;
wherein said ECU determines a difference between detection of the other vehicle via processing at said ECU of transferred image data and detection of the other vehicle via processing at said ECU of transferred sensor data; and
wherein said ECU disables at least part of a driving assist function based on the determined difference being greater than a threshold level.

25. The vehicular driving assist system of claim 24, wherein the captured sensor data comprises a three dimensional point cloud of data.

26. The vehicular driving assist system of claim 24, wherein the driving assist function comprises at least three selected from the group consisting of (i) automatic headlamp control, (ii) lane keeping assist and (iii) traffic sign recognition.

27. The vehicular driving assist system of claim 24, wherein the driving assist function comprises a forward collision warning function.

28. The vehicular driving assist system of claim 24, wherein the driving assist function comprises an automatic emergency braking function.

29. The vehicular driving assist system of claim 24, wherein the driving assist function comprises a pedestrian detection function.

30. The vehicular driving assist system of claim 24, wherein, responsive to said ECU disabling at least part of the driving assist function, said ECU generates an output to alert a driver of the equipped vehicle that the at least part of the driving assist function has been disabled.

31. The vehicular driving assist system of claim 24, wherein the at least part of the driving assist function that is disabled by said ECU comprises the entire driving assist function.

32. The vehicular driving assist system of claim 24, wherein the difference between detection of the other vehicle via processing at said ECU of transferred image data and detection of the other vehicle via processing at said ECU of transferred sensor data is determined via said ECU determining presence of the other vehicle via processing of transferred image data and said ECU failing to detect the other vehicle via processing of transferred sensor data.

33. The vehicular driving assist system of claim 32, wherein the at least part of the driving assist function that is disabled by said ECU comprises processing of transferred sensor data for object detection so that the driving assist function is provided responsive to processing of transferred image data.

34. The vehicular driving assist system of claim 24, wherein the difference between detection of the other vehicle via processing at said ECU of transferred image data and detection of the other vehicle via processing at said ECU of transferred sensor data is determined via said ECU determining presence of the other vehicle via processing of transferred sensor data and said ECU failing to detect the other vehicle via processing of transferred image data.

35. The vehicular driving assist system of claim 34, wherein the at least part of the driving assist function that is disabled by said ECU comprises processing of transferred image data for object detection so that the driving assist function is provided responsive to processing of transferred sensor data.

36. The vehicular driving assist system of claim 24, wherein said ECU determines misalignment of said 3D lidar sensor relative to said camera responsive to (i) detecting the other vehicle at a first location via processing of transferred image data, (ii) detecting the other vehicle at a second location via processing of transferred sensor data, and (iii) determining that the second location of the detected other vehicle is different from the first location of the detected other vehicle by at least a threshold amount.

37. The vehicular driving assist system of claim 24, wherein said ECU, via processing of transferred image data, determines a vision-based angle of the detected other vehicle relative to the equipped vehicle, and wherein said ECU, via processing of transferred sensor data, determines a sensor-based angle of the detected other vehicle relative to the equipped vehicle, and wherein, based on the determined vision-based angle and the determined sensor-based angle, said ECU disables the at least part of the driving assist function.

38. The vehicular driving assist system of claim 37, wherein said ECU disables the at least part of the driving assist function based at least in part on a determined angle difference between the determined vision-based angle and the determined sensor-based angle being greater than a disable threshold angle.

39. The vehicular driving assist system of claim 38, wherein, responsive at least in part to the determined angle difference being greater than a correction threshold angle and less than the disable threshold angle, a corrected angle of the detected other vehicle relative to the equipped vehicle is determined for use with the driving assist function.

40. The vehicular driving assist system of claim 24, wherein said ECU operates to determine the difference between detection of the other vehicle via processing at said ECU of transferred image data and detection of the other vehicle via processing at said ECU of transferred sensor data responsive at least in part to a vehicle speed of the equipped vehicle being greater than a threshold speed.

41. The vehicular driving assist system of claim 24, wherein said ECU disables the at least part of the driving assist function responsive at least in part to a vehicle speed of the equipped vehicle being greater than a threshold speed.

42. The vehicular driving assist system of claim 24, wherein said ECU disables the at least part of the driving assist function based on the determined difference being greater than the threshold level for a threshold period of time.

43. The vehicular driving assist system of claim 24, wherein transferred image data and transferred sensor data are fused at said ECU.

44. The vehicular driving assist system of claim 24, wherein the imaging array sensor of said camera comprises a CMOS imaging array sensor.

45. The vehicular driving assist system of claim 24, wherein said 3D lidar sensor is disposed at a front portion of the equipped vehicle.

46. A vehicular driving assist system, said vehicular driving assist system comprising:
a camera disposed at an in-cabin side of a windshield of a vehicle equipped with said vehicular driving assist system, said camera viewing through the windshield at least forward of the equipped vehicle, said camera capturing image data;
wherein said camera comprises an imaging array sensor having at least one million photosensor elements arranged in rows and columns;
a non-vision sensor disposed at the equipped vehicle and sensing at least forward of the equipped vehicle, said non-vision sensor capturing sensor data;
wherein captured image data is transferred from said camera to an electronic control unit (ECU) disposed at the equipped vehicle;
wherein captured sensor data is transferred from said non-vision sensor to said ECU;
wherein said ECU comprises at least one data processor;
wherein transferred image data and transferred sensor data are processed at said ECU;
wherein a pedestrian forward of the equipped vehicle is detected via processing at said ECU of transferred image data and via processing at said ECU of transferred sensor data;
wherein said ECU determines a difference between detection of the pedestrian via processing at said ECU of transferred image data and detection of the pedestrian via processing at said ECU of transferred sensor data; and
wherein said ECU disables at least part of a driving assist function based on the determined difference being greater than a threshold level.

47. The vehicular driving assist system of claim 46, wherein the driving assist function comprises at least three selected from the group consisting of (i) automatic headlamp control, (ii) lane keeping assist and (iii) traffic sign recognition.

48. The vehicular driving assist system of claim 46, wherein the driving assist function comprises a forward collision warning function.

49. The vehicular driving assist system of claim 46, wherein the driving assist function comprises an automatic emergency braking function.

50. The vehicular driving assist system of claim 46, wherein the driving assist function comprises a lane keeping assist function.

51. The vehicular driving assist system of claim 46, wherein, responsive to said ECU disabling at least part of the driving assist function, said ECU generates an output to alert a driver of the equipped vehicle that the at least part of the driving assist function has been disabled.

52. The vehicular driving assist system of claim 46, wherein the at least part of the driving assist function that is disabled by said ECU comprises the entire driving assist function.

53. The vehicular driving assist system of claim 46, wherein said ECU determines misalignment of said non-vision sensor relative to said camera responsive to (i) detecting the pedestrian at a first location via processing of transferred image data, (ii) detecting the pedestrian at a second location via processing of transferred sensor data, and (iii) determining that the second location of the detected pedestrian is different from the first location of the detected pedestrian by at least a threshold amount.

54. The vehicular driving assist system of claim 46, wherein said ECU, via processing of transferred image data, determines a vision-based angle of the detected pedestrian relative to the equipped vehicle, and wherein said ECU, via processing of transferred sensor data, determines a sensor-based angle of the detected pedestrian relative to the equipped vehicle, and wherein, based on the determined vision-based angle and the determined sensor-based angle, said ECU disables the at least part of the driving assist function.

55. The vehicular driving assist system of claim 54, wherein said ECU disables the at least part of the driving assist function based at least in part on a determined angle difference between the determined vision-based angle and the determined sensor-based angle being greater than a disable threshold angle.

56. The vehicular driving assist system of claim 55, wherein, responsive at least in part to the determined angle difference being greater than a correction threshold angle and less than the disable threshold angle, a corrected angle of the detected pedestrian relative to the equipped vehicle is determined for use with the driving assist function.

57. The vehicular driving assist system of claim 56, wherein the corrected angle is determined after a threshold period of time during which the determined angle difference is greater than the correction threshold angle and less than the disable threshold angle.

58. The vehicular driving assist system of claim 46, wherein said ECU operates to determine the difference between detection of the pedestrian via processing at said ECU of transferred image data and detection of the pedestrian via processing at said ECU of transferred sensor data responsive at least in part to a vehicle speed of the equipped vehicle being greater than a threshold speed.

59. The vehicular driving assist system of claim 46, wherein said ECU disables the at least part of the driving assist function responsive at least in part to a vehicle speed of the equipped vehicle being greater than a threshold speed.

60. The vehicular driving assist system of claim 46, wherein said ECU disables the at least part of the driving assist function based on the determined difference being greater than the threshold level for a threshold period of time.

61. The vehicular driving assist system of claim 46, wherein said non-vision sensor is disposed at a front portion of the equipped vehicle.

62. The vehicular driving assist system of claim 46, wherein the imaging array sensor of said camera comprises a CMOS imaging array sensor.

* * * * *